United States Patent
Zhao

(10) Patent No.: US 7,852,612 B2
(45) Date of Patent: Dec. 14, 2010

(54) SUPERCAPACITOR USING CARBON NANOSHEETS AS ELECTRODE

(75) Inventor: Xin Zhao, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 256 days.

(21) Appl. No.: 11/976,574

(22) Filed: Oct. 25, 2007

(65) Prior Publication Data
US 2008/0232028 A1    Sep. 25, 2008

Related U.S. Application Data

(60) Provisional application No. 60/855,221, filed on Oct. 30, 2006.

(51) Int. Cl.
*H01G 9/00* (2006.01)
*H01B 1/04* (2006.01)

(52) U.S. Cl. ............................. 361/502; 252/502

(58) Field of Classification Search ............... 361/502; 252/502
See application file for complete search history.

(56) References Cited

U.S. PATENT DOCUMENTS

| 5,372,686 A | 12/1994 | Timberlake et al. |
| 6,104,600 A * | 8/2000 | Suhara et al. ............ 361/502 |
| 6,361,861 B2 | 3/2002 | Gao et al. |
| 6,872,330 B2 * | 3/2005 | Mack et al. ............ 252/378 R |
| 7,071,258 B1 * | 7/2006 | Jang et al. ............ 524/496 |
| 7,566,410 B2 * | 7/2009 | Song et al. ............ 252/511 |
| 7,623,340 B1 * | 11/2009 | Song et al. ............ 361/502 |
| 2003/0175462 A1 | 9/2003 | Nishino et al. |
| 2003/0185741 A1 * | 10/2003 | Matyjaszewski et al. 423/445 R |
| 2003/0224168 A1 | 12/2003 | Mack et al. |
| 2007/0158618 A1 * | 7/2007 | Song et al. ............ 252/500 |
| 2007/0258192 A1 * | 11/2007 | Schindall et al. ............ 361/503 |
| 2008/0212261 A1 * | 9/2008 | Ajayan et al. ............ 361/502 |
| 2009/0011204 A1 * | 1/2009 | Wang et al. ............ 428/215 |

FOREIGN PATENT DOCUMENTS

WO    WO 2005084172 A2 *    9/2005

OTHER PUBLICATIONS

French, B.L., et al., "Structural Characterization of Carbon Nanosheets via X-Ray Scattering", *Journal of Applied Physics*, 97, 114317-1 (2005).

J. Schindall, "The Charge of the Ultra-Capacitors"—*IEEE-Spectrum*- Nov. 2007 retrieved from www.spectrum.ieee.org.

Zhao, Xin, Poster—"Application of Carbon Nanosheets in Supercapacitors", Presented at 2007 Virginia Innovation Showcase.

Zhao, X. et al., "Thermal Desorption of Hydrogen from Carbon Nanosheets", *Journal of Chemical Physics*, 124, 194704 (2006).

(Continued)

*Primary Examiner*—Eric Thomas
*Assistant Examiner*—David M Sinclair
(74) *Attorney, Agent, or Firm*—Foley & Lardner LLP

(57) ABSTRACT

A supercapacitor comprises a first electrode, a second electrode, and a separator. The electrodes are created with carbon nanosheets in various configurations. For example, the carbon nanosheets may be disposed orthogonal to a surface to which it is attached and comprise a single graphene layer or multiple graphene layers. The electrodes are impregnated with an electrolyte.

16 Claims, 4 Drawing Sheets

OTHER PUBLICATIONS

Yeh, Ted, Thesis "The Ultracapacitor Characterization of Functionalized Graphene Sheets," Apr. 2006, Princeton University, 62 pages.

Affoune et al., "Experimental evidence of a single nano-graphene," J. Chem. Lett., 2001, vol. 348, pp. 17-20.

Aizawa et al., "Bond softening in monolayer graphite formed on transition-metal carbide surfaces," Phy. Rev. B, 1990, vol. 42, pp. 11469-11478.

Al-Jishi et al., Phys. Rev. B., 1982, vol. 26, pp. 4514-4522.

Andersson et al., "Structure and electronic properties of graphite nanoparticles," Phys. Rev. B., 1998, vol. 58, pp. 16387-16385.

Ando et al., "Preparation of carbon nanotubes by arc-discharge evaporation," Japanese Journal of Applied Physics, Part 2: Letters, 1993, vol. 32, pp. L107-L109.

Ando et al., "Production of petal-like graphite sheets by hydrogen arc discharge," Carbon, 1997, vol. 35, pp. 153-158.

Baughman et al., Science, 2002, vol. 297, pp. 787-792.

Bonard et al., Solid-State Electron., 2001, vol. 45, pp. 893-914.

Chen et al., "Exfoliation of graphite flake and its nanocomposites," Carbon, 2003, vol. 41, pp. 619-621.

Chen et al., "Preparation and characterization of graphite nanosheets from ultrasonic powdering technique," Carbon, 2004, vol. 42, pp. 753-759.

Chen et al., "Preparation of polystyrene/graphite nanosheet composite," Polymer, 2003, vol. 44, pp. 1781-1784.

Chung et al., Diamond and Related Materials, 2001, vol. 10, pp. 248-250.

Deckman et al., Appl. Phys. Lett., 1982, vol. 41, pp. 377-379.

Deckman et al., J. Vac. Sci. Technol. B, 1983, vol. 1, pp. 1109-1112.

Deckman et al., J. Vac. Sci. Technol. B, 1988, vol. 6, pp. 333-336.

Dresselhaus et al., Adv. Phys., 2000, vol. 49, pp. 705-814.

Ebbesen et al., "Large-scale synthesis of carbon nanotubes," Nature, 1992, vol. 358, pp. 220-222.

Ferrari et al., "Interpretation of Raman spectra of disordered and amorphous carbon," Phys. Rev. B, 2000, vol. 61, pp. 14095-14107.

Gonzalez et al., "Electron-electron interactions in grapheme sheets," Phys. Rev. B, 2001, vol. 63, pp. 134421/1-1/8.

Gröning et al., Solid-State Electron, 2001, vol. 45, pp. 929-944.

Hass, K.C., Phys. Rev. B., 1992, vol. 46, pp. 139-150.

Holloway, Brian C., "Carbon Nanostructures—New Morphologies of an Old Element,"BCHPNNL Presentation, Jun. 14, 2004, 43 pgs.

Huang et al., "Growth of large periodic arrays of carbon nanotubes," Appl. Phys. Lett., Jan. 20, 2003, vol. 82, No. 3, pp. 460-462.

Hulteen et al., J. Phys. Chem. B, 1999, vol. 103, pp. 3854-3863.

Hulteen et al., J. Vac. Sci. Technol. A, 1995, vol. 13, pp. 1553-1558.

Iijima et al., "Structures of carbon soot prepared by laser ablation," J. Phys. Chem., 1996, vol. 100, pp. 5839-5843.

Jishi et al., Chem. Phys. Lett., 1993, vol. 209, pp. 77-82 (Abstract).

Jung et al., Appl. Surf. Sci., 2002, vol. 193, pp. 129-137.

Kuang et al., "Low temperature solvothermal synthesis of crumpled carbon nanosheets," Carbon, 2004, vol. 42, pp. 1737-1741.

Kusakabe et al., "Indication of flat-band magnetism in theoretically designed nanographite with modified zigzag edges," Journal of Magnetism and Magnetic Materials, 2004, vol. 272-276, pp. E737-E738.

Kusakabe et al., Phys. Rev. B: Condensed Matter and Materials Physics, 2003, vol. 67, pp. 092406 (abstract).

Lespade et al., "Model for raman scattering from incompletely graphitized carbons," Carbon, 1982, vol. 20, pp. 427-431 (abstract).

Lieberman et al., Principles of plasma discharges and materials processing, New York, Wiley, 1994, pp. 387-411.

Lim et al., J. Non-Cryst. Solids, 2002, vol. 864, pp. 299-302.

Makarova et al., "Magnetic properties of carbon structures, Semiconductors," (Translation of Fizika i Tckhnika Poluprovodnikov (Saqkt-Peterburg)), 2004, vol. 38, pp. 641-664.

Michaelson, H.B., J. Appl. Phys., 1949, vol. 21, pp. 536-540.

Milne et al., Diamond Relat. Mater., 2001, vol. 10, pp. 260-264.

Nakada et al., "Edge state in grapheme ribbons: nanometer size effect and edge shape dependence," Phys. Rev. B, 1996, vol. 54, pp. 17954-17961.

Nemanich et al., "First- and second-order Raman scattering from finite-size crystals of graphite," Phys. Rev. B, 1979, vol. 20, pp. 392-401.

Nemanich et al., Mater. Sci. Eng., 1977, vol. 31, pp. 157-160.

Nicklow et al., "Lattice dynamics of pyrolytic graphite," Phys. Rev. B., 1972, vol. 3, No. 5, pp. 4951-4962.

Obraztsov et al., "Electron field emission and structural properties of carbon chemically vapor-deposited films," Diamond and Related Materials, 1999, vol. 8, pp. 814-819.

Obraztsov et al., "Field emission characteristics of nanostructured thin film carbon materials," Appl. Surf. Sci., 2003, vol. 215, pp. 214-221.

Oshima et al., "Surface phonon dispersion curves of graphite (0001) over the entire energy region," Solid State Comm., 1988, vol. 65, pp. 1601-1604 (abstract).

Oshiyama et al., "Prediction of electronic properties of carbon-based nanostructures," Physica B, 2002, vol. 323, pp. 21-29.

Paillard et al., Phys. Rev. B, 1994, vol. 49, pp. 11433-11439.

Park et al., J. Vac. Sci. Technol. B, 2003, vol. 21, pp. 562-566.

Peigney et al., "Specific surface area of carbon nanotubes and bundles of carbon nanotubes," Carbon, 2001, vol. 39, pp. 507-514.

Pfeiffer et al., Appl. Phys. Lett., 2003, vol. 82, pp. 4149-4150.

Prasad et al., "Heat-treatment effect on the nanosized graphite [$\pi$]-electron system during diamond to graphite conversion," Phys. Rev. B., 2000, vol. 62, pp. 11209-11218.

Prawer et al., Chem. Phys. Lett., 2000, vol. 332, pp. 93-97.

Rao et al., Science, 1997, vol. 275, pp. 187-191.

Raravikar et al., Phys. Rev. B, 2002, vol. 66, pp. 234424/1-235424/9.

Robertson, J., J. Vac. Sci. Technol. B, 1995, vol. 17, pp. 659-665.

Saito, Y., J. Nanosci. Nanotechnol., 2003, vol. 3, pp. 39-50.

Shang et al., "Uniform carbon nanoflake films and their field emissions," J. Chem. Lett., 2002, vol. 358, pp. 187-191.

Solin, S.A., Physica B&C, 1980, vol. 99, pp. 443-452 (abstract).

Tuinstra et al., "Raman spectrum of graphite," J. Chem. Phys., 1970, vol. 53, pp. 1126-1130.

Viculis et al., A chemical route to carbon nanoscrolls, Science, 2003, vol. 299, p. 1361.

Wakabayashi et al., "Electronic and magnetic properties of nanographite ribbons," Phys. Rev. B, 1999, vol. 59, pp. 8271-8282.

Wang et al., "Free-standing subnanometer graphite sheets," Applied Physics Letters, Aug. 16, 2004, vol. 85, No. 7, pp. 1265-1267.

Wang et al., "Synthesis and field-emission testing of carbon nanoflake edge emitters," J. Vac. Sci. Technol. B, May/Jun. 2004, vol. 22, No. 3, pp. 1269-1272.

Wang et al., "Synthesis of carbon nanosheets by inductively coupled radio-frequency plasma enhanced chemical vapor deposition," Carbon, 2004, pp. 1-6.

Winzer et al., Appl. Phys. A: Mater. Sci. Process., 1996, vol. 63, pp. 617-619 (abstract).

Wu et al., "Carbon nanowalls and related materials," Journal of Materials Chemistry, 2004, vol. 14, pp. 469-477.

Wu et al., "Carbon Nanowalls Grown by Microwave Plasma Enhanced Chemical Vapor Deposition," Advanced Materials, Jan. 4, 2002, pp. 64-67.

Yue et al., Appl. Phys. Lett. 2002, vol. 81, No. 2, pp. 355-357.

Zhu et al., "Nitrogen Doped Carbon Nanoflakes Synthesized by RFI PECVD on Patterned Nickel Catalyst Layer," 2003 Poster, AVS 03 Baltimore, MD, 1 page.

Zhu et al., Appl. Phys. Lett., 1999, vol. 75, pp. 873-875.

Zhu et al., Science, 1998, vol. 282, pp. 1471-1473.

Zhu et al., Solid-State Electron., 2001, vol. 45, pp. 921-928.

Non-Final Office Action mailed Nov. 5, 2009, in copending U.S. Appl. No. 10/574,507 (US 2009/0011204), 20 pages.

Shang et al., "Uniform carbon nanoflake films and their field emissions," Chemical Physics Letters, 2002, 358:187-191.

* cited by examiner

SUPERCAPACITOR USING CARBON NANOSHEETS AS ELECTRODE

CROSS-REFERENCE TO RELATED PATENT APPLICATIONS

This application claims priority from Provisional Application U.S. Application 60/855,221, filed Oct. 30, 2006, incorporated herein by reference in its entirety.

FIELD OF THE DISCLOSURE

The present disclosure relates generally to the field of capacitors; and, more particularly, to the field of supercapacitors.

BACKGROUND

A capacitor is an electrical device that can store energy in the electric field between a pair of closely spaced conductors. When voltage is applied to the capacitor, electrical charges of equal magnitude, but opposite polarity, build up on each plate. It is known by fundamental physical law that the capacitance of a capacitor is determined by the surface area of the parallel plates ($C \approx \epsilon A/d$, A is surface area). Capacitors are used in electrical circuits as energy-storage devices.

A supercapacitor (or ultracapacitor) is an electrochemical double layer capacitor that has usually high capacitance when compared to common capacitors. The capacitance of a supercapacitor is established by the electrochemical double layer. The physical mechanism of the electrochemical double layer has been elaborated in previous literature such as: Conway, B. E., *Electrochemical Supercapacitors: Scientific Fundamentals and Technological Applications* (2004); Burke, A., Ultracapacitors: Why, How, and Where Is The Technology. *Journal of Power Sources* 91, 37-50 (2000); and Pandolfo, A. G. & Hollenkamp, A. F., Carbon Properties And Their Role In Supercapacitors. *Journal of Power Sources* 157, 11-27 (2006).

The supercapacitor's high capacitance comes from using conductive materials of very high specific surface area. Most conventional supercapacitors use active carbon fiber cloth, active carbon particles or carbon fibers as electrode materials. These carbon materials are used because they have high theoretical specific surface area (~1000-2000 $m^2/g$). Correspondently, the calculated capacitance per surface area for active carbon materials is about 10-15 $\mu F/cm^2$. Therefore, supercapacitors using active carbon material as electrodes have much higher capacitance (100-300 F/g) compared to common capacitors (on the order of $\mu F$ or pF). With such high capacitance, supercapacitors are used as energy storage devices. Because supercapacitors have much less internal resistance than batteries, they are particularly suitable for providing transient power, for example providing cold-cranking pulse power in electrical vehicles.

The energy stored in a capacitor is calculated by $(1/2)CV^2$. The maximum power that a capacitor can output is $V^2/(4R)$. R is the equivalent series resistance. It is known that conventional supercapacitors have a working voltage of ~3V.

According to Pandolfo and Hollenkamp, the carbon supercapacitor has specific energy of 1-10 Wh/kg and specific power of 0.5-10 KW/kg. In order to improve the performance of supercapacitors, advanced materials should be used as electrode materials.

Two factors limit the capacitance of superconductors—the pore distribution and the resistance of the electrode material. Electrolytes cannot access pores less than 2 nm in diameter. Small pores limit the capacitance of the electrode material. To improve the performance of the active carbon material used as electrodes, the pore distribution of the material should be optimized. The resistance of electrodes is another constraint that limits the specific power of supercapacitors. To increase the specific power of supercapacitors, both the bulk resistance and interface resistance of electrode materials should be rendered very small.

SUMMARY

One exemplary embodiment of the disclosure relates to a supercapacitor comprising a first electrode, a second electrode, and a separator located between the first electrode and the second electrode. The first electrode includes at least one carbon nanosheet. The second electrode includes at least one carbon nanosheet. The first electrode and the second electrode are impregnated with an electrolyte.

BRIEF DESCRIPTION OF THE DRAWINGS

FIG. 1A is a detail view of the carbon fiber of FIG. 1 in accordance with an exemplary embodiment.

FIG. 2A is a detail view of the carbon particle of FIG. 2 in accordance with an exemplary embodiment.

DETAILED DESCRIPTION OF EXEMPLARY EMBODIMENTS

A supercapacitor using carbon nanosheets as electrodes and method of assembly are described. In the following description, for purposes of explanation, numerous specific details are set forth to provide a thorough understanding of the exemplary embodiments. It will be evident, however, to one skilled in the art that the exemplary embodiments may be practiced without these specific details.

A carbon nanosheet is a novel carbon nano-material with a graphite structure developed by Dr. J. J. Wang et al. at the College of William and Mary. As used herein, "carbon nanosheet" refers to a carbon nanoflake with a thickness of 2 nanometers or less. These carbon nanosheets are two-dimensional graphite sheets made up of a single to several graphene layers. The thickness of the carbon nanosheet can vary from a single graphene layer to two, three, four, or more layers, such as one to seven graphene layers. For example, the carbon nanosheet comprises one to three graphene layers and has thickness of 1 nanometer or less. The specific surface area of the carbon nanosheet is between 1000 $m^2/g$ to 2600 $m^2/g$ and the carbon nanosheet has a height between 100 nm and 8 $\mu m$, such as 100 nm to 2 $\mu m$. The carbon nanosheet can be provided in a substantially pure form and may comprise a freestanding nanosheet disposed on its edge on a substrate, as will be described below.

Figure 5:
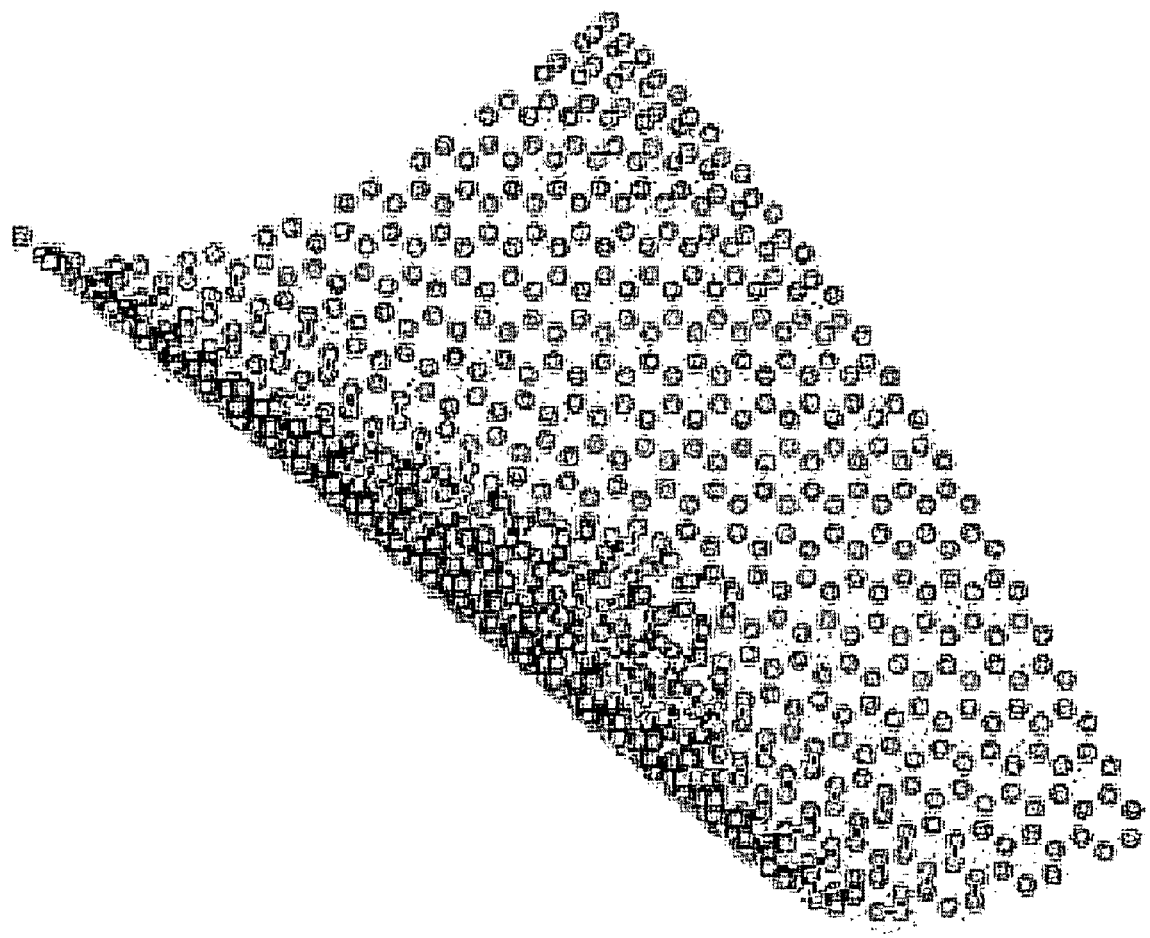
FIG. 5 is an illustration of a carbon nanosheet consisting of one graphene layer.

Referring to FIG. 5, an illustration of a carbon nanosheet consisting of one graphene layer is shown. With only 1 to 7 layers of graphene planes, the carbon nanosheet is about 1 nm thick. Its height and length is each about 1 micrometer. The structure and fabrication method of carbon nanosheets have been published in several peer reviewed journals such as: Wang, J. J. et al., Free-standing Subnanometer Graphite Sheets. *Applied Physics Letters* 85, 1265-1267 (2004); Wang, J. et al., Synthesis of Carbon Nanosheets by Inductively Coupled Radio-frequency Plasma Enhanced Chemical Vapor Deposition. *Carbon* 42, 2867-72 (2004); Wang, J. et al., Synthesis and Field-emission Testing of Carbon Nanoflake Edge Emitters. *Journal of Vacuum Science & Technology B* 22, 1269-72 (2004); French, B. L., Wang, J. J., Zhu, M. Y. & Holloway, B. C., Structural Characterization of Carbon Nanosheets via X-ray Scattering. *Journal of Applied Physics* 97, 114317-1-8 (2005); and Zhao, X. et al., Thermal Desorption of Hydrogen from Carbon Nanosheets. *Journal of Chemical Physics* 124, 194704 (2006), as well as described in U.S. patent application Ser. No. 10/574,507 filed on Oct. 4, 2004 and PCT published application WO 05/084172 A2, which are incorporated herein by reference in their entirety.

The graphite structure of the carbon nanosheet suggests that the material has very high electrical conductivity. A carbon nanosheet's morphology can remain stable at temperatures up to 1000° C. The carbon nanosheet has large specific surface because of its sub-nanometer thickness. The carbon nanosheet's morphology has many open passages, which suggests that electrolyte could easily access its pores. Thus, carbon nanosheets can be used to improve the performance of electrodes in a supercapacitor.

Figure 1:
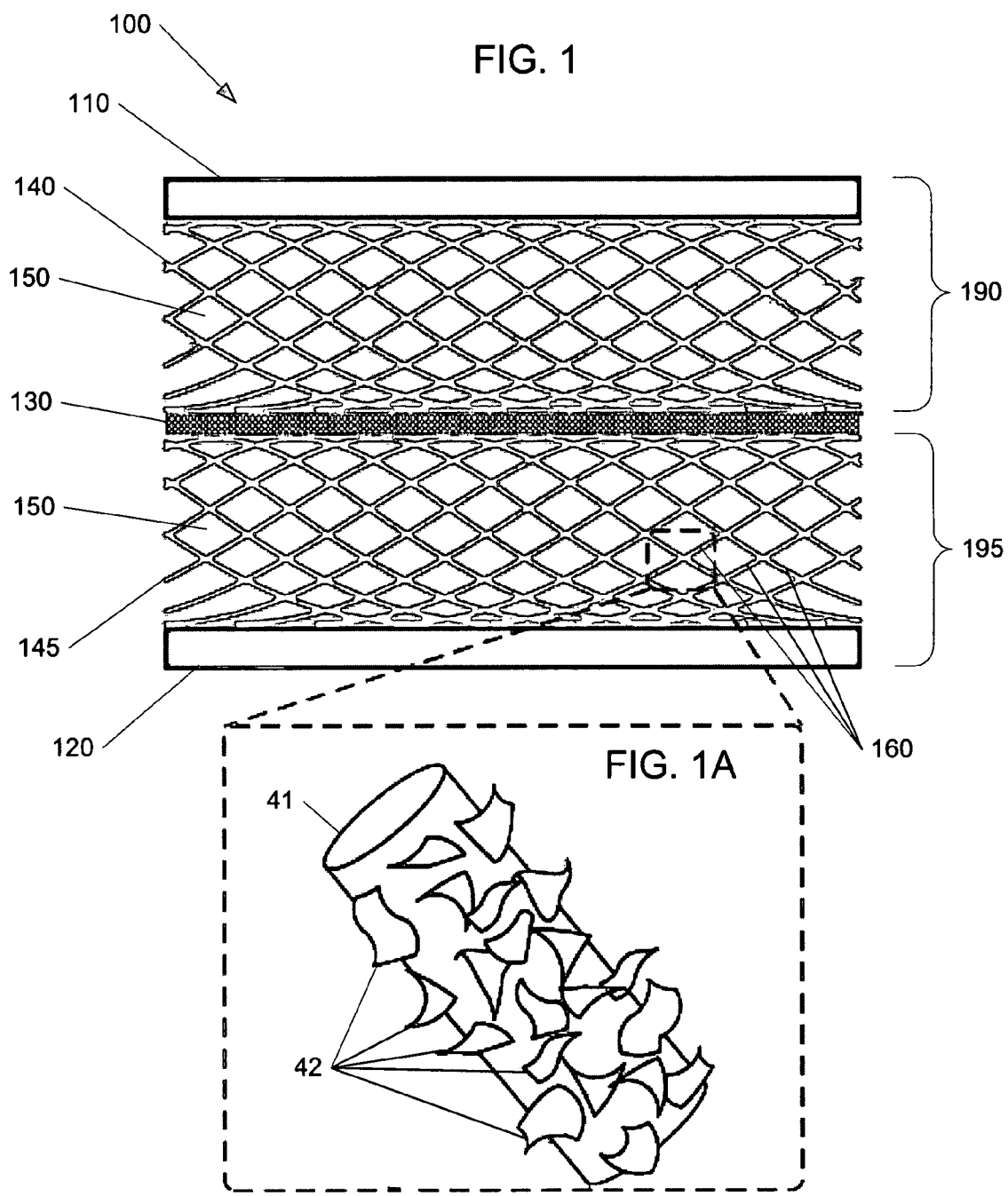
FIG. 1 is a diagram of a supercapacitor with electrode materials comprised of carbon fibers and carbon nanosheets in cross-sectional view.

Referring now to FIG. 1, in accordance with an exemplary embodiment, a diagram of a supercapacitor with electrode materials comprised of carbon fibers and carbon nanosheets in cross-sectional view is shown. A supercapacitor 100 includes a first collector 110 and a second collector 120. The first collector 110 and the second collector 120 are in parallel geometry. The first collector 110 and the second collector 120 are used as electrical contacts to make connections in an electrical circuit. A separator 130 is located between the first collector 110 and the second collector 120. The separator 130 is parallel to the first collector 110 and to the second collector 120. A first carbon fiber cloth 140 is sandwiched in between the first collector 110 and the separator 130. Likewise, a second carbon fiber cloth 145 is sandwiched in between the second collector 120 and the separator 130. The first collector 110 and the first carbon fiber cloth 140 form a first electrode 190. The second carbon fiber cloth 145 and the second collector 120 form a second electrode 195. The space in between the first collector 110 and the separator 130 and the space in between the second collector 120 and the separator 130 are saturated with an electrolyte 150 so that the first carbon fiber cloth 140 and the second carbon fiber cloth 145 are saturated with the electrolyte 150. The first collector 110, the first carbon fiber cloth 140, the separator 130, second carbon fiber cloth 145, and the second collector 120 are laminated together with the electrolyte 150 to make the supercapacitor 100.

The first collector 110 and the second collector 120 are made of a conductive material such as aluminum. Other metals such as gold, silver, and various alloys can be used as known in the art. Additionally, a base collector metal can be plated with a metal such as gold in order to reduce the cost of manufacture, improve the electrical properties of the junction, and to provide a better substrate for carbon nanosheet attachment. Likewise, conductive polymers can be used for the first collector 110 and the second collector 120. The first collector 110 and the second collector 120 can be made of two different materials. In an alternative embodiment, one or both or the collectors can be a doped semiconductor, polysilicon or it equivalents, or a metal layer on a semiconductor substrate. For example, a collector can be formed as an aluminum layer on a silicon substrate.

The first collector 110 and the second collector 120 can be formed into various shapes such as rectangles, circles, or any other shape. The electrodes can be rolled and placed into can or cylindrical form as is well known in the art. The supercapacitor 100 can be encapsulated. Additionally, the first collector 110 and the second collector 120 can have different surface textures. One or both of the surfaces can be roughened, trenched, or "corrugated" in order to increase the active surface area of the electrodes.

The separator 130 is made of a porous membrane such as a polymer. The separator 130 separates the first collector 110 and the second collector 120 into distinct regions of electrical polarity and thus prevents a short circuit. The separator 130 allows ions in the electrolyte 150 to pass through. To permit free migration of ions, the separator 130 is comprised of nonconductive porous materials such as polyester, polyolefin, fiberglass, or other cellulosic materials. The separator 130 is typically the same shape as the first collector 110 and the second collector 120; however, any other shape can be used. Likewise, the separator 130 can have various cross-sections and surface textures. For example, the separator 130 can be corrugated, be roughened, and/or include openings. The porosity of the material can be varied. Additionally, the separator 130 can be constructed of multiple materials. For example, one side of the separator 130 can be made of polyester and the other side can be made of paper.

The electrolyte 150 can be an alkali (e.g. KOH), acid (e.g. $H_2SO_4$), or other non-aqueous organic (e.g. acetonitrile) electrolyte material. The electrolyte solution impregnates the surface of the first collector 110 and the surface of the second collector 120, the separator 130, the first carbon fiber cloth 140, and the second carbon fiber cloth 145. Thus an electrochemical double layer is established along the interface of electrolyte and the collectors.

The first carbon fiber cloth 140 and the second carbon fiber cloth 145 are made of carbon fiber cloth. This carbon fiber cloth is made of carbon fibers 160. The carbon fiber cloth can be of various densities and quality; and be woven or non-woven. The first carbon fiber cloth 140 can be of a different density (weight) than the second carbon fiber cloth 145. Other type of cloth may also be used.

Referring now to FIG. 1A, a detail view of the carbon fiber of FIG. 1 in accordance with an exemplary embodiment is shown. A carbon fiber 41 is covered with carbon nanosheets 42. Hence, the carbon fiber cloth of FIG. 1 is covered with carbon nanosheets. The carbon nanosheets 42 can be attached to or grown on the carbon fiber 41 through various methods well known in the art such as a thermal chemical deposition method or a microwave plasma chemical deposition method. The carbon nanosheets 42 can be activated by various methods. Likewise, the density (i.e. the number and size) and attachment geometry of the carbon nanosheets 42 to the carbon fiber 41 can vary. The carbon nanosheets 42 can be grown orthogonal to the carbon fiber 41 shaft (i.e. vertically from the surface). By varying the density of the carbon nanosheets 42 the active surface area of the carbon fiber cloth can be changed. Likewise, the density of the carbon nanosheets 42 can affect the efficiency of the electrolyte. The carbon nanosheets 42 can also be of various sizes, thicknesses, and shapes. For instance, the carbon nanosheets 42 can be one layer thick or multiple layers thick.

Advantageously, the coated carbon fibers enhance the performance of the supercapacitor. Before coating, a carbon fiber surface is smooth on a nanometer scale. Carbon nanosheets typically grow vertically on the carbon fibers. The carbon nanosheets enhance the specific area of each carbon fiber; and the coating reduces the internal resistance of the collectors.

Figure 2:
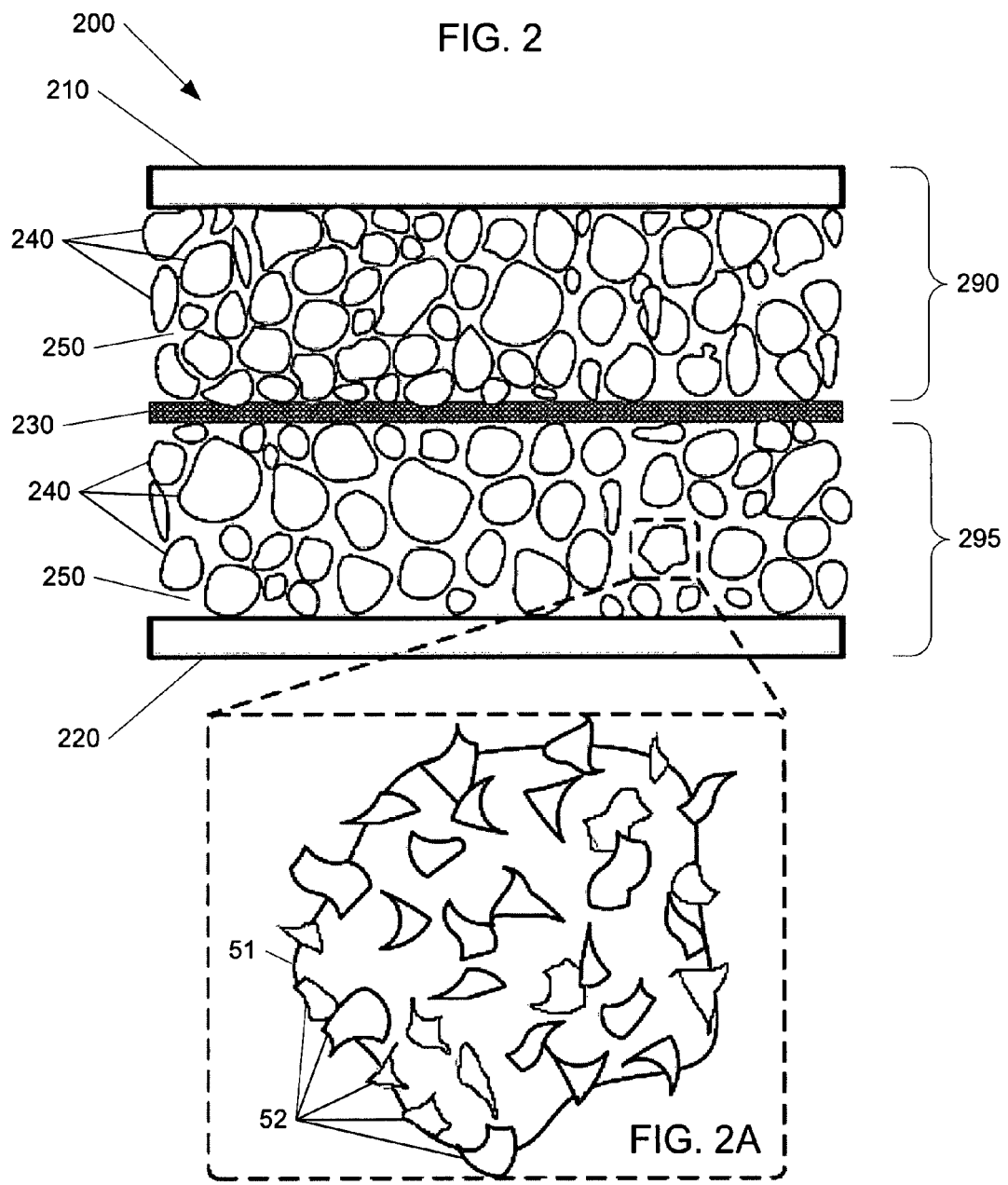
FIG. 2 is a diagram of a supercapacitor with electrode materials comprised of carbon particles and carbon nanosheets in cross-sectional view.

Referring now to FIG. 2, in another exemplary embodiment, a diagram of a supercapacitor with electrode materials comprised of carbon particles and carbon nanosheets in cross-sectional view is shown. A supercapacitor 200 includes a first collector 210 and a second collector 220. The first collector 210 and the second collector 220 are in parallel geometry. The first collector 210 and the second collector 220 are used as electrical contacts to make connections in an electrical circuit. A separator 230 is located between the first collector 210 and the second collector 220. The separator 230 is parallel to the first collector 210 and to the second collector 220. Carbon particles 240 are sandwiched in between the first collector 210 and the separator 230, and in between the second collector 220 and the separator 230. The first collector 210 and its adjacent carbon particles 240 form a first electrode 290. The second collector 220 and its adjacent carbon particles 240 form a second electrode 295. The space in between the first collector 210 and the separator 230 and the space in between the second collector 220 and the separator 230 are saturated with an electrolyte 250 so that the carbon particles 240 on either side of the separator 230 are saturated with the electrolyte 250. The first collector 210, the carbon particles 240, the separator 230, the carbon particles 240, and the second collector 220 are laminated together with the electrolyte 250 to make the supercapacitor 200.

Referring now to FIG. 2A, a detail view of the carbon particle of FIG. 2 in accordance with an exemplary embodiment is shown. A carbon particle 51 is covered with carbon nanosheets 52. Other types of particles may also be used. The carbon particle 51 is typically porous. Hence, the carbon particle 51 and the carbon nanosheets 52 are impregnated with electrolyte. The carbon nanosheets 52 can be attached to or grown on the carbon particle 51 through any suitable method. The carbon nanosheets 52 can be activated by various methods. Likewise, the density (i.e. the number and size) and attachment geometry of the carbon nanosheets 52 to the carbon particle 51 can vary. Similarly, carbon particles can be of varying sizes and shapes. The carbon nanosheets 52 can be grown orthogonal to the carbon particle 51 surface (i.e. vertically from the surface). By varying the density of the carbon nanosheets 52 the active surface area of the carbon particle 51 can be changed. Likewise, the density of the carbon nanosheets 52 can effect the efficiency of the electrolyte. The carbon nanosheets 52 can also be of various sizes, thicknesses, and shapes. For instance, the carbon nanosheets 52 can be one layer thick or multiple layers thick.

Figure 3:
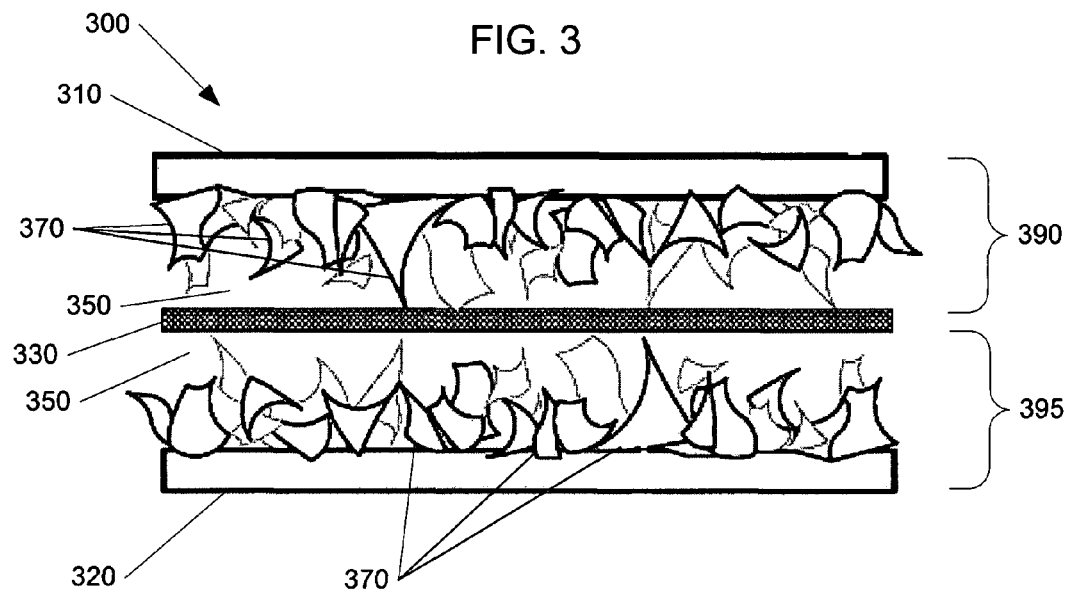
FIG. 3 is a diagram of a supercapacitor with carbon nanosheets directly coated on electrodes in cross-sectional view.

Referring now to FIG. 3, in another exemplary embodiment, a diagram of a supercapacitor with carbon nanosheets directly coated on collectors in cross-sectional view is shown. A supercapacitor 300 includes a first collector 310 and a second collector 320. The first collector 310 and the second collector 320 are in parallel geometry. The first collector 310 and the second collector 320 are used as electrical contacts to make connections in an electrical circuit. A separator 330 is located between the first collector 310 and the second collector 320. The separator 330 is parallel to the first collector 310 and to the second collector 320. The inside surfaces of the first collector 310 and the second collector 320 are covered with carbon nanosheets 370. The first collector 310 and its carbon nanosheets 370 form a first electrode 390. The second collector 320 and its carbon nanosheets 370 form a second electrode 395. The space in between the first collector 310 and the separator 330 and the space in between the second collector 320 and the separator 330 are saturated with an electrolyte 350 so that the carbon nanosheets 370 on either side of the separator 330 are saturated with the electrolyte 350. The first collector 310, the separator 330, and the second collector 320 are laminated together with the electrolyte 350 to make the supercapacitor 300.

The carbon nanosheets 370 can be attached to or grown on the first collector 310 and the second collector 320 through various methods well known in the art. The carbon nanosheets 370 can be activated by various methods. Likewise, the density (i.e. the number and size) and attachment geometry of the carbon nanosheets 370 to the first collector 310 and the second collector 320 can vary. The carbon nanosheets 370 can be grown orthogonal to surfaces of the first collector 310 and the second collector 320 (i.e. vertically from the surface). By varying the density of the carbon nanosheets 370 the active surface area of the first collector 310 and the second collector 320 can be changed. Likewise, the density of the carbon nanosheets 370 can effect the efficiency of the electrolyte. The carbon nanosheets 370 can also be of various sizes, thicknesses, and shapes. For instance, the carbon nanosheets 370 can be one layer thick or multiple layers thick.

Figure 4:
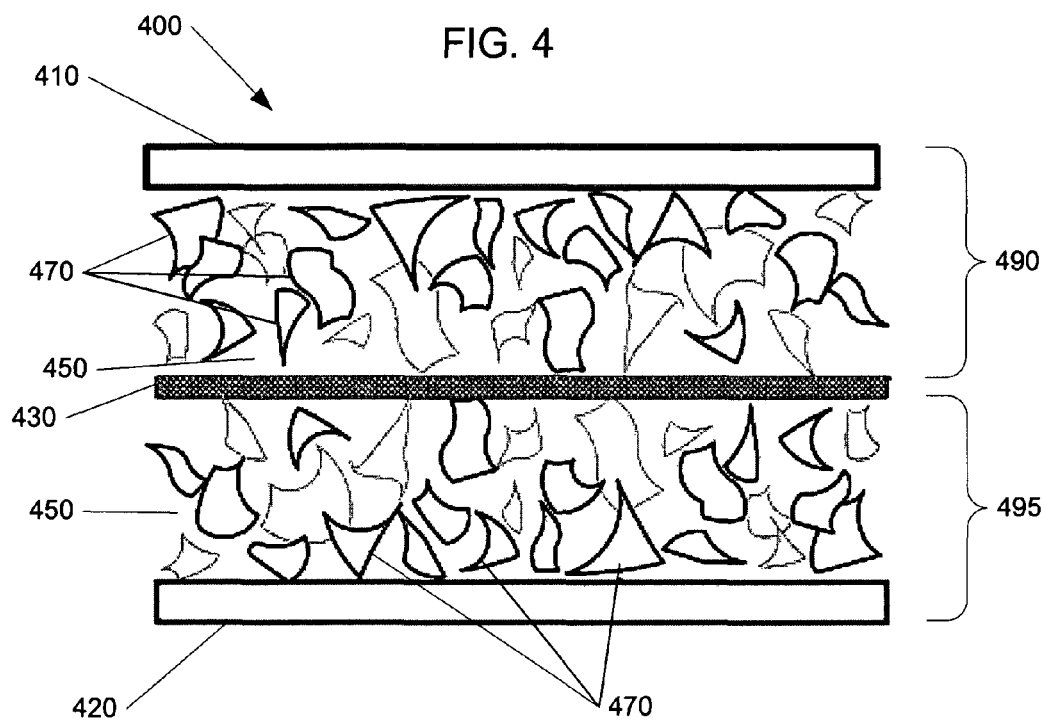
FIG. 4 is a diagram of a supercapacitor with carbon nanosheets mixed with a bonding agent used as electrodes in cross-sectional view.

Referring now to FIG. 4, in another exemplary embodiment, a diagram of a supercapacitor with carbon nanosheets mixed with a bonding agent used as electrodes in cross-sectional view is shown. A supercapacitor 400 includes a first collector 410 and a second collector 420. The first collector 410 and the second collector 420 are in parallel geometry. The first collector 410 and the second collector 420 are used as electrical contacts to make connections in an electrical circuit. A separator 430 is located between the first collector 410 and the second collector 420. The separator 430 is parallel to the first collector 410 and to the second collector 420. The space in between the first collector 410 and the separator 430 and the space in between the second collector 420 and the separator 430 are filled with carbon nanosheets 470 (ex-situ) held together with a bonding agent. The carbon nanosheets 470 are synthesized on a growth substrate, are extracted from the growth substrate, and mixed with a bonding agent. A polymer resin such as a polyvinylalcohol resin, a polytetrafluoroethylene resin, a phenolic resin or a carboxylmethyl cellulose resin can be used as the bonding agent. The first collector 410 and its adjacent carbon nanosheets 470 held together with a bonding agent form a first electrode 490. The second collector 420 and its adjacent carbon nanosheets 470 held together with a bonding agent form a second electrode 495. The space in between the first collector 410 and the separator 430 and the space in between the second collector 420 and the separator 430 are saturated with an electrolyte 450. Hence, the carbon nanosheets 470 and the bonding agent are impregnated with the electrolyte 450. The first collector 410, the carbon nanosheets 470 held together with a bonding agent, the separator 430, the carbon nanosheets 470 held together with a bonding agent, and the second collector 420 are laminated together with the electrolyte 450 to make the supercapacitor 400.

Advantageously, as detailed above in the exemplary embodiments, a supercapacitor using carbon nanosheets as part of the electrode achieves higher capacitance than conventional supercapacitors, because the carbon nanosheets used as electrodes or current collectors have optimized pore distribution and high electrical conductivity, which gives the supercapacitor using carbon nanosheets as electrodes higher capacitance and higher specific power (KW/kg) than conventional supercapacitors.

The foregoing description of the exemplary embodiments have been presented for purposes of illustration and of description. It is not intended to be exhaustive or to limit the invention to the precise form disclosed, and modifications and variations are possible in light of the above teachings or may be acquired from practice of the invention. For example, the described exemplary embodiments focused on an implementation designed with specific materials. The present invention, however, is not limited to a particular material. Those skilled in the art will recognize that the apparatus and methods of the present invention may be advantageously using different materials for the electrodes, electrolyte, and separator. Additionally, the supercapacitor may be constructed of multiple layers, using different electrolytes in different layers. Likewise, the electrodes can be formed into various configurations using more than two electrodes. For example, electrodes of alternating materials and polarity may be placed in the same plane. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A supercapacitor, comprising:
  a first electrode, wherein the first electrode comprises a first plurality of carbon nanosheets;
  a second electrode, wherein the second electrode comprises a second plurality of carbon nanosheets; and
  a separator located between the first electrode and the second electrode, wherein the first electrode and the second electrode are impregnated with an electrolyte;
  wherein:
    each of the first and second plurality of carbon nanosheets is orthogonal to a surface to which it is attached such that the electrolyte is provided into open passages between the first and second plurality of carbon nanosheets.

2. The supercapacitor of claim 1, wherein:
  the first electrode is comprised of a first collector and a first carbon fiber cloth, wherein the first carbon fiber cloth includes a first plurality of carbon fibers, and wherein the first plurality of carbon nanosheets at least partially cover the surfaces of the first plurality of carbon fibers; and
  the second electrode is comprised of a second collector and a second carbon fiber cloth, wherein the second carbon fiber cloth includes a second plurality of carbon fibers, and wherein the second plurality of carbon nanosheets at least partially cover the surfaces of the second plurality of carbon fibers.

3. The supercapacitor of claim 1, wherein:
  the first electrode is composed of a first collector and a first set of carbon particles, wherein the first set of carbon particles is located between the first collector and the separator, and wherein the first set of carbon particles is at least partially covered with the first plurality of carbon nanosheets;
  the second electrode is composed of a second collector a second set of carbon particles, wherein the second set of carbon particles is located between the second collector and the separator, and wherein the second set of carbon particles is at least partially covered with the second plurality of carbon nanosheets.

4. The supercapacitor of claim 1, wherein:
  the first electrode is composed of a first collector which is at least partially covered with the first plurality of carbon nanosheets located orthogonal to a surface of the first collector; and
  the second electrode is composed of a second collector which is at least partially covered with the second plurality of carbon nanosheets located orthogonal to a surface of the second collector.

5. The supercapacitor of claim 4, wherein the plurality of carbon nanosheets comprise free standing nanosheets disposed on their edge on the respective one of the first and the second collector.

6. The supercapacitor of claim 5, wherein the first and second plurality of carbon nanosheets are provided in pure form.

7. The supercapacitor of claim 1, wherein each of the first and second plurality of carbon nanosheets has a thickness of 2 nanometers or less.

8. The supercapacitor of claim 7, wherein:
  the thickness of each of the first and second plurality of carbon nanosheets is 1 nanometer or less; and
  each of the first and second plurality of carbon nanosheets comprises one to seven graphene layers.

9. The supercapacitor of claim 8, wherein each of the first and second plurality of carbon nanosheets comprises a single graphene layer.

10. The supercapacitor of claim 1, wherein:
  a specific surface area of the first and second plurality of carbon nanosheets is between 0.1000 $m^2/g$ and 2600 $m^2/g$; and
  each of the first and second plurality of carbon nanosheets has a height between 100 nm and 8 μm.

11. The supercapacitor of claim 1, wherein the first and second plurality of carbon nanosheets comprise free standing nanosheets disposed on their edge on the surface.

12. The supercapacitor of claim 11, wherein the first and second plurality of carbon nanosheets are provided in pure form.

13. A supercapacitor electrode comprising a plurality of carbon nanosheets disposed on a substrate, wherein each of the plurality of carbon nanosheets is orthogonal to a surface of the substrate such that an electrolyte can be provided into open passages between the plurality of carbon nanosheets.

14. The supercapacitor electrode of claim 13, wherein the plurality of carbon nanosheets comprise free standing nanosheets disposed on their edge on the substrate.

15. A method for making a supercapacitor, comprising:
  forming an electrode including a plurality of carbon nanosheets disposed on a substrate, wherein each of the plurality of carbon nanosheets is orthogonal to a surface of the substrate such that an electrolyte can be provided into open passages between the plurality of carbon nanosheets; and
  providing the electrode into a supercapacitor.

16. The method of claim 15, wherein the plurality of carbon nanosheets comprise free standing nanosheets disposed on their edge on the substrate.

* * * * *